United States Patent Office 3,256,362
Patented June 14, 1966

3,256,362
PROCESS FOR MODIFYING POLYOLEFINES WITH UNSATURATED POLYESTERS
Hans Craubner, Karlsruhe, Gerhard Illing, Neuleiningen, Pfalz, and Kurt Demmler, Ludwigshafen (Rhine), Germany, assignors, by mesne assignments, to H. Roemmler G.m.b.H., Mannheim, Germany, a company of Germany
No Drawing. Filed Oct. 17, 1961, Ser. No. 145,765
Claims priority, application Germany, Oct. 19, 1960, B 59,792
8 Claims. (Cl. 260—862)

This invention relates to modified polyolefines. More specifically, it relates to a new composition of matter produced from polyolefines and ethylenically unsaturated polyesters. The invention furthermore relates to a process for the production of the said products.

Polyolefines, as for example polyethylene, or also polystyrene, have, besides their known valuable properties, also various shortcomings. Thus they readily become electrostatically charged and their solubility and swellability in aromatic solvents restricts their applicability. It is furthermore difficult to print polyolefines and they are generally susceptible to stress corrosion.

It is an object of the present invention to provide a process for the production of modified polyolefines from polyolefines and ethylenically unsaturated polyesters. Another object of the invention is to provide a new composition of matter comprising a high percentage of a polyolefine and a comparatively small quantity of ethylenically unsaturated polyester and exhibiting new and improved mechanical properties as compared with the polyolefines used as starting materials. Other objects of the invention will become apparent to those skilled in the art from the following description.

The said and further objects are accomplished by intensely kneading a mixture of at least one high molecular weight synthetic polyolefine in admixture with up to 50% by weight of at least one ethylenically unsaturated polyester and at least one free radical forming catalyst at temperatures from 60 to 350° C.

The term polyolefines as used in this specification means polymers prepared in the conventional manner, i.e., by the well-known processes for the high and low pressure polymerization of mono-olefines containing 2 to 4 carbon atoms, such as ethylene, propylene, butylene-1, butylene-2 and isobutylene. These polymers in general have melt indices from 0.1 to 30. The preferred polylefines are the solid polyethylenes, known as low and high density polyethylenes, and the high molecular weight polypropylenes and polyisobutylenes. Polyolefines of this kind are in general readily available commercially.

The ethylenically unsaturated polyesters to be used according to this invention are modified and unmodified polyesters prepared from polyols with $\alpha,\beta$-unsaturated polybasic carboxylic acids. These polyesters have molecular weights above 500, preferably 1000 to 3000. Polyesters with molecular weights up to about 6000 can also be used. The unsaturated polyesters can be prepared in the manner well known in the art.

By polybasic carboxylic acids we understand organic carboxylic acids containing at least 2 carboxy groups, preferably 2 to 4 carboxy groups.

Maleic acid, fumaric acid, dichloromaleic acid, itaconic acid, citraconic acid and mesaconic acid, i.e., $\alpha,\beta$-ethylenically unsaturated dicarboxylic acids containing 4 or 5 carbon atoms are especially suitable as $\alpha,\beta$-unsaturated polybasic acids for the production of the polyesters. We prefer polyesters prepared from maleic acid and fumaric acid. For the preparation of the unsaturated polyesters, polybasic saturated organic carboxylic acids containing 4 to 17 carbon atoms, such as dicarboxylic acids, adipic acid, phthalic acid, isophthalic acid, endomethylenehexachlorotetrahydrophthalic acid, succinic acid, glutaric acid, heptadecanedicarboxylic acid, terephthalic acid, tetrachlorophthalic acid and tetrabromophthalic acid and the tetracarboxylic acid pyromellitic acid may additionally be used. By polyols we understand polyhydric alcohols containing at least 2 hydroxy groups, preferably 2 to 6 hydroxy groups, but polyhydric alcohols containing more than 6 hydroxy groups are also suitable in some instances. Suitable polyols are especially ethylene glycol, diethylene glycol, propylene glycol, butane-diol-1,4, butane-diol-1,3, neopentyl glycol and also triethylene glycol, endomethylenehexachlorodihydroxymethylcyclohexane, 2,2-bis-(4-hydroxycyclohexyl)-propane, 2,2-bis-[p-($\beta$-hydroxyethoxy)-phenyl]-propane, glycerol, pentaerythritol, tetramethylolcyclohexanol, sorbitol, mannitol and also butinediol. The preferred polyols are ethylene glycol, propylene glycol, butane-diol-1,3, butane-diol-1,4 and neopentyl glycol. Such carboxylic acids and polyols are in general used in about equimolar amounts in the production of the polyesters. It is, however, also possible to use a slight excess of up to about 10 mole percent of carboxylic acid or polyol. Some of the polybasic carboxylic acids may also be replaced by a small portion, i.e., up to about 10 mole percent, of a monocarboxylic acid, such as abietic acid, and by a higher fatty acid, i.e., an aliphatic monocarboxylic acid containing from 16 to 20 carbon atoms, as for example stearic acid or palmitic acid. Moreover, some of the polyols may be replaced by monohydric alcohols, as for example benzyl alcohol and furfuryl alcohol. Furthermore the unsaturated polyesters may be modified by preparing them in known manner with an addition of a small amount of an isocyanate, as for example phenyl isocyanate, iso-octyl isocyanate, toluylene di-isocyanate or hexamethylene di-isocyanate. Such unsaturated polyesters are kneaded according to this invention with polyolefines in amounts of up to 50% by weight, preferably 1 to 30% by weight, based on the total weight of ethylenically unsaturated polyester and polyolefine. In general 0.3 to 50% by weight of unsaturated polyester gives satisfactory results.

Part of the ethylenically unsaturated polyester can also be replaced with advantage by ethylenically unsaturated monomers, i.e., vinylaromatic monomers containing in the molecule one benzene nucleus, and/or by methyl and ethyl acrylate and methacrylate, preferably by styrene. In this case, the unsaturated polyester is preferably used in admixture with the vinylaromatic monomer and/or acrylic and/or methacrylic ester which contain from 0.01 to 50, preferably 10 to 40% by weight of vinylaromatic and/or acrylic monomers, percentages based on the weight of the mixture. Further vinylaromatic monomers are $\alpha$-methylstyrene, p-iso-propylstyrene and o- and p-vinyltoluene. When using ethylenically unsaturated monomers and ethylenically unsaturated polyesters these components are applied in an amount of from together 0.6 to 50, preferably from 1 to 30% by weight, based on the total weight of polyolefine, unsaturated polyester and ethylenically unsaturated monomer.

Free radical forming catalysts which may be used for the purposes of this invention are especially organic compounds which decompose into radicals at temperatures from 60° to 350° C. and have an average life of a few tenths of a second, say ⅖ of a second, up to a few minutes, say up to about 3 to 5 minutes. Suitable catalysts are peroxides, such as cumene hydroperoxide, dicumyl peroxide, tertiary-butyl hydroperoxide, di-tertiary-butyl peroxide, 2,5-di-(tertiary-butylperoxy)-2,5-dimethylhexane, dibenzoyl peroxide, phthaloyl peroxide, dichlorobenzoyl peroxide, lauroyl peroxide, tertiary-butyl perbenzoate and azo-bis carboxylic acid nitriles, such as azo-bis-isobutyronitrile. It is advantageous to use 0.05 to 10, preferably 0.1 to 5% by weight, based on the total weight of the mixture of polyolefines, unsaturated polyesters, free radical forming organic catalysts and any ethylenically unsaturated monomers.

The said components are intensely kneaded according to this invention. Kneading is advantageously carried out at temperatures between 60° and 350° C., preferably between 80° and 270° C. Machines conventionally used for kneading and homogenizing thermoplastics, such as calenders, kneading machines and refiners, and preferably single-shaft and multi-shaft screw extruders and disk kneaders are suitable for the purpose. In the gaps formed in such machines by the boundary surfaces which move relatively to each other, for example by the wall of the extruder chamber and the screw in screw extruders, high shear stressess are set up. These shear stresses may amount to up to 1500 kg./cm.$^2$ or more. Machines of this type are the better suited for the process according to the invention the higher the shear stresses which can be achieved therein. The speed gradients G generally occuring in the machines include $10^3$ and $10^5$ seconds$^{-1}$ or more.

In the process according to this invention the components may first be premixed in the usual mixing machines, such as propeller mixers, and then supplied to the kneading machines via the usual metering equipment, shaking troughs and conveyor belts. However, the components may also be supplied separately to the kneading machines. The process according to this invention may be carried out batchwise and with advantage also continuously. Additives, as for example pigments, fillers and dyes and stabilizing agents which do not react with the catalysts under the conditions of kneading, may also be added to the components. If desired, accelerators such as are generally used with peroxides as additives for hardening unsaturated polyester resins may also be added.

According to the process of the present invention, modified polyolefines are obtained which, as compared with the initial polyolefines, have advantageous properties, as for example improved resistance to aging, tensile strength, elongation, printability, dyeability, impact resistance, ball indentation hardness, diminished susceptibility to stress corrosion and diminished permeability to certain gases. They may be processed by the conventional processing methods for thermoplastics as for example by injection molding or by the deep-drawing method. Modified polyolefines prepared according to this invention are suitable for the production of shaped articles, such as films, sheets, adhesive films, machine parts, such as gear wheels and casings, and household articles. They are also suitable for cable covering.

A process for the production of shaped articles is known in which a mixture of monovinylaromatic compounds, unsaturated polyesters and up to 50% by weight of thermoplastic polymers, such as polyisobutylene, or also polyethylene, is polymerized in the presence of polymerization catalysts in molds. By this known process shaped articles are obtained which have a crosslinked structure and which have no thermoplastic behavior. The products obtained by this known process therefore cannot be extruded and shaped in an economical manner.

The invention is illustrated by, but not limited to, the following examples in which the parts and percentages mentioned are by weight.

Example 1

1 part of di-tertiary-butyl peroxide and 0.2 part of benzoyl peroxide are added to a mixture of 90 parts of polyethylene, which according to ASTM D 1238–T has the melt index 1.0 g./10 minutes and the density 0.960 g./cc., and 10 parts of an unsaturated polyester (prepared in the usual way from 116 parts of fumaric acid and 90 parts of butane-diol-1,4) with the softening point 110° C. (according to Krämer, Sarnow and Nagel) and the acid number 25. The mixture is intensely kneaded in a commerically available two-shaft disk kneader for 50 seconds at 210° to 230° C. The reaction product is then cooled in conventional manner and comminuted. A modified polyethylene is obtained which has the density 0.93 g./cc. and the softening range 169° to 176° C. and which when kept in boiling water for an hour adsorbs 0.19% of water. Its tensile strength is 361 kg./cm.$^2$, its elongation (DIN 53,371) 27.5%, its dielectric dissipation factor (DIN 53,483) tan $\delta=0.07$ and its dielectric constant $\epsilon=2.6$. As compared with unmodified polyethylene, it has improved dimensional stability and printability. It may be injection molded to rigid, opaque, shaped articles and blown to films and hollow articles.

Example 2

77.3 parts of polyethylene which according to ASTMD 1238–T has the melt index 19 g./10 minutes and the density 0.918 g./cc., 4.5 parts of polypropylene which has the melt index 3.51 g./10 minutes, the molecular weight 445,000 and the density 0.90 g./cc., and 18.2 parts of a solution in styrene of an unsaturated polyester, prepared in the usual way from 148 parts of phthalic anhydride, 196 parts of maleic anhydride and 242 parts of propylene glycol, with the viscosity 1000 to 1200 cp. (DIN 53,655) and the acid number 34, the solution containing in 100 parts 65 parts of the unsaturated polyester, is mixed in conventional manner. Then 0.5 part of di-tertiary-butyl peroxide is added while stirring. The mixing obtained is then intensely kneaded in a commercially available double-screw extruder for 1 minute at 200° to 230° C. The reaction product is then cooled and granulated in conventional manner. A modified polyolefine is obtained which has rubber-like properties. Its density is 0.949 g./cc., its softening range is 129° to 144° C., its dielectric dissipation factor (DIN 53,483) tan $\delta=0.004$, its dielectric constant $\epsilon=2.6$, its tensile strength 182 kg./cm.$^2$ (DIN 53,371) and its elongation 54.6% (DIN 53,371). When kept in boiling water for an hour, it adsorbs 0.33% of water. It may be processed in commercial injection molding machines and is suitable, for example, for the production of elastic shaped articles, films for insulating purposes and for cable coverings. It can be dyed like other thermoplastic resins.

Example 3

1 part of di-tertiary-butyl peroxide is sprayed onto a mixture of 54 parts of polyisobutylene which has the Shore hardness A according to DIN 53,505=30 and the density 0.92 g./cc., 36 parts of high-pressure polyethylene which has the melt index 2.0 g./10 minutes and the density 0.918 g./cc. and 10 parts of an unsaturated polyester (prepared in the usual way from 116 parts of fumaric acid and 90 parts of butane-diol-1,4) which has a softening range of 110° C. (according to Krämer, Sarnow and Nage) and the acid number 25. The mixture is intensely kneaded in a commercial two-shaft disc kneader for about 40 seconds at 200° to 220° C.

A rubber-elastic modified polyolefine is obtained which has a density of 0.929 g./cc. and which adsorbs 0.18% of water when kept in boiling water for one hour. It is suitable for the production of sheets and films, especially adhesive films. It may also be added to other plastics and to rubber to improve the mechanical and thermal properties.

What we claim is:

1. A process for the production of modified polyolefines comprising intensely kneading under a shear stress of the order of magnitude of 1500 kg./cm.$^2$ a mixture consisting essentially of (A) a high molecular weight synthetic polyolefine of a 2 to 4 carbon atom monolefine, said polyolefine having a melt index of about 0.1 to 30, (B) from 0.3 to 30% by weight of an ethylenically un-unsaturated polyester prepared from polyols with $\alpha,\beta$-unsaturated polybasic carboxylic acids and having a molecular weight from 500 to 6000 based on the total weight of polyolefine and polyester, and (C) 0.05 to 10% by weight, based on the total weight of components (A) and (B) of a free radical forming catalyst at a temperature from 60 to 350° C.

2. A process as claimed in claim 1 wherein kneading is carried out at a temperature from 80 to 270° C.

3. A composition of matter produced according to claim 1.

4. A process as claimed in claim 1 wherein said mixture contains about 1 to 30% by weight of said polyester, with reference to the total weight of polyolefine and polyester.

5. A process for the production of modified polyolefines comprising intensely kneading at a temperature from 60 to 350° C. under a shear stress of the order of magnitude of 1500 kg./cm.$^2$ a mixture consisting essentially of:
(A) a high molecular weight polyolefine of a 2 to 4 carbon atom monolefine, said polyolefine having a melt index of about 0.1 to 30;
(B) the combination of
(1) an ethylenically unsaturated polyester prepared form polyols with $\alpha,\beta$-unsaturated polybasic carboxylic acids and having a molecular weight from 500 to 6000, and
(2) an ethylenically unsaturated monomer selected from the group consisting of vinylaromatic monomers containing one benzene nucleus in the molecule, methyl acrylate, ethyl acrylate, methyl methacrylate and ethyl methacrylate in an amount of 0.01 to 50% by weight with reference to the total weight of (1) and (2), component (B) being present in an amount of about 0.6 to 30% by weight, with reference to the total weight of (A) and (B); and
(C) a free radical forming catalyst in an amount of about 0.05 to 10% by weight, based on the total weight of components (A) and (B).

6. A process as claimed in claim 5 wherein the ethylenically unsaturated monomer is styrene.

7. A process as claimed in claim 5 wherein the ethylenically unsaturated monomer is used in an amount of about 10 to 40% by weight with reference to the total weight of (1) and (2).

8. A composition of matter produced according to claim 5.

References Cited by the Examiner

UNITED STATES PATENTS

| | | | |
|---|---|---|---|
| 2,919,475 | 1/1960 | Cole | 260—94.9 |
| 2,991,269 | 6/1961 | Nozaki | 260—878 |
| 3,079,312 | 2/1963 | Alsys | 260—878 |
| 3,153,029 | 10/1964 | Tabor et al. | 260—878 |

FOREIGN PATENTS 541,825 6/1957 Canada.

MURRAY TILLMAN, *Primary Examiner.*

LEON J. BERCOVITZ, SAMUEL H. BLECH,
*Examiners.*

J. A. KOLASCH, J. T. GOOLKASIAN,
*Assistant Examiners.*